(12) United States Patent
Ishida

(10) Patent No.: US 12,437,242 B2
(45) Date of Patent: Oct. 7, 2025

(54) RENTAL SPACE

(71) Applicant: TAISHO SKY BUILDING, INC., Tokyo (JP)

(72) Inventor: Kazuharu Ishida, Tokyo (JP)

(73) Assignee: Taisho Sky Building, Inc., Tokyo (JP)

( * ) Notice: Subject to any disclaimer, the term of this patent is extended or adjusted under 35 U.S.C. 154(b) by 0 days.

(21) Appl. No.: 17/644,093

(22) Filed: Dec. 13, 2021

(65) Prior Publication Data
US 2022/0108234 A1 Apr. 7, 2022

Related U.S. Application Data

(63) Continuation of application No. PCT/JP2019/023441, filed on Jun. 13, 2019.

(51) Int. Cl.
*G06Q 10/02* (2012.01)
*B65G 1/137* (2006.01)
(Continued)

(52) U.S. Cl.
CPC .......... *G06Q 10/02* (2013.01); *B65G 1/1371* (2013.01); *G06Q 10/06313* (2013.01);
(Continued)

(58) Field of Classification Search
CPC ............ G06Q 10/02; G06Q 10/06313; G06Q 10/06315; G06Q 50/28; G06Q 30/0284; G06Q 10/0836; B65G 1/1371
See application file for complete search history.

(56) References Cited

U.S. PATENT DOCUMENTS

2004/0249671 A1* 12/2004 Noguchi ................ G16H 40/40
705/5
2004/0267623 A1* 12/2004 Vivadelli ............... G06Q 10/06
379/212.01
(Continued)

FOREIGN PATENT DOCUMENTS

CN 1771507 A 5/2006
JP 2002-150178 A 5/2002
(Continued)

OTHER PUBLICATIONS

Dhanalaxmi et al., "An User-Friendly Android based Application for Online Rental System," 2021 Fifth International Conference on I-SMAC (IoT in Social, Mobile, Analytics and Cloud) (I-SMAC), Palladam, India, 2021, pp. 1030-1038, doi: 10.1109/I-SMAC52330.2021.964101 (Year: 2021).*

(Continued)

*Primary Examiner* — Rupangini Singh
*Assistant Examiner* — Tayar M Kyu
(74) *Attorney, Agent, or Firm* — Morgan, Lewis & Bockius LLP

(57) ABSTRACT

A rental space includes a host connected to the Internet and a terminal device that receives information input from the user to the host, and the host includes a reservation manager that manages reservation information on use reservation received from the terminal device, an equipment manager that manages equipment information on equipment stored in a warehouse, and a management controller that controls the reservation manager and the equipment manager. The management controller generates a transportation command for transporting the equipment to a reserved room on a reservation date and time on the basis of the reservation information and the equipment information, and a transportation control unit receives the transportation command from the management controller via the Internet, and causes a transportation unit to transport the equipment to the reserved room by the reservation date and time based on the transportation command.

6 Claims, 3 Drawing Sheets

(51) Int. Cl.
  *G06Q 10/0631* (2023.01)
  *G06Q 10/08* (2024.01)
  *G06Q 30/0283* (2023.01)

(52) U.S. Cl.
  CPC ....... *G06Q 10/06315* (2013.01); *G06Q 10/08* (2013.01); *G06Q 30/0284* (2013.01)

(56) References Cited

U.S. PATENT DOCUMENTS

| | | | |
|---|---|---|---|
| 2006/0020481 A1* | 1/2006 | Lee | G06Q 30/0645 705/5 |
| 2010/0316470 A1* | 12/2010 | Lert | B65G 1/0492 414/807 |
| 2013/0197959 A1 | 8/2013 | Gupta | |
| 2018/0268473 A1 | 9/2018 | Um et al. | |
| 2018/0299864 A1* | 10/2018 | Byers | G06N 20/00 |

FOREIGN PATENT DOCUMENTS

| | | | |
|---|---|---|---|
| JP | 2004100233 A | * | 4/2004 |
| JP | 2008-030942 A | | 2/2008 |
| JP | 2011-008747 A | | 1/2011 |
| JP | 2016-061114 A | | 4/2016 |
| JP | 2018-025972 A | | 2/2018 |

OTHER PUBLICATIONS

Office Action dated Jul. 14, 2021 for the corresponding Taiwanese Patent Application No. TW109119666, 6 pgs.
Taisho Sky Building, Inc., International Search Report and Written Opinion, PCT/JP2019/023441, Sep. 3, 2019, 11 pgs.
Decision to Grant for the corresponding Japanese Patent Application No. 2019- 549493, Oct. 8, 2019, 4 pgs.

* cited by examiner

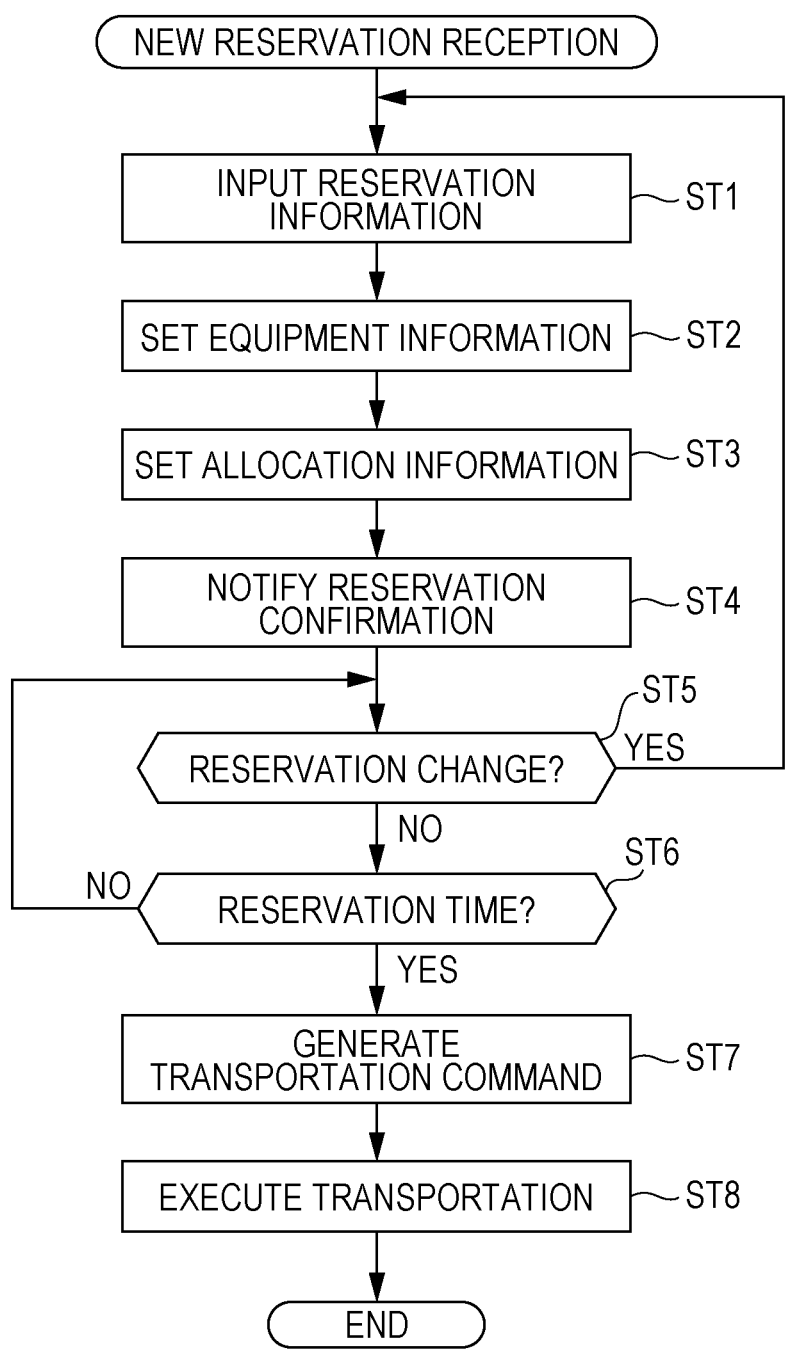

RENTAL SPACE

RELATED APPLICATIONS

The present application is a continuation of International Patent Application No. PCT/JP2019/023441, filed Jun. 13, 2019, which is hereby incorporated by reference in its entirety.

TECHNICAL FIELD

This disclosure relates to a reservation system for setting a usage time and renting a space to a user.

BACKGROUND

A system for renting rooms of a building (e.g., an office, a hotel, or the like) to users typically includes a management server open to a communication network (e.g., the Internet), and a plurality of reservation servers in which information on the conference room is stored. Such a system is typically configured so that users can access information describing the conference room in a reservation server via the management server and reserve a desired conference room. Such a system also typically has a billing function so that a rental fee can be paid online.

On the other hand, an apartment building system may include an automated warehouse building adjacent to the apartment building and a container management room for managing a container stored in a predetermined rack in the automated warehouse building. In such a system, a computer in the container management room may manage address information of the rack storing a predetermined container, receive a command from a resident, and control an operation such as driving a storage and delivery carriage to store the container in a predetermined rack or to take out the container stored in the rack to the container management room.

However, such conventional systems do not manage equipment for use by the user and do not combine automated warehouse systems with rental systems. Further, even if a conventional rental system is combined with a conventional automated warehouse system, the user of the rental room would need to go to the container management room, take out the equipment from the container automatically carried by the storage and delivery carriage, and carry the equipment to a reserved room by himself/herself, and thus this combined system cannot sufficiently improve convenience of the user.

SUMMARY

An object of the present disclosure is to provide a reservation system (also referred to as a rental facility) for a rental space that makes it more convenient for a user to use the equipment in the rented space.

The reservation system of the present disclosure is a reservation system for setting a usage time and renting a space to a user, including a management device that is connected to a communication line to manage information; a user input unit that is connected to the management device via the communication line and receives information input from the user to the management device; an equipment storage unit that stores equipment available in the space; a transportation unit that moves between the equipment storage unit and the space, to transport the equipment; and a transportation control unit that is connected to the management device via the communication line and controls the transportation unit, in which the management device includes: a reservation manager that manages reservation information including user information, date and time information, and spatial information on use reservation received from the user input unit; an equipment manager that manages equipment information on the equipment stored in the equipment storage unit; a storage that stores the reservation information and the equipment information; and a management controller that controls the reservation manager and the equipment manager, the management controller generates a transportation command for transporting the equipment to a reserved space on a reservation date and time on the basis of the reservation information and the equipment information, and the transportation control unit receives the transportation command from the management controller via the communication line, and causes the transportation unit to transport the equipment to the reserved space by the reservation date and time based on the transportation command.

According to the present disclosure, the management controller of the management device generates the transportation command for transporting the equipment to the reserved space on the reservation date and time on the basis of the reservation information and the equipment information, and the transportation control unit receives the transportation command from the management controller via the communication line, and causes the transportation unit to transport the equipment to the reserved space by the reservation date and time based on the transportation command. Therefore, the equipment can be transported to the reserved space according to the reservation of the user, and the user can reduce time required for preparation on the day of the reservation, so that the convenience of the user can be improved.

In some implementations, the equipment stored in the equipment storage unit is user equipment deposited in advance by the user, and the management controller causes the storage to store the equipment information in which the user equipment is associated with the user who has deposited the user equipment.

According to such a configuration, with respect to the user equipment deposited in advance by the user, the management controller causes the storage to store the equipment information in which the user equipment is associated with the user who has deposited the user equipment, so that the user equipment can be reliably transported to the reserved space in accordance with date and time of use reserved by the user.

In some implementations, the equipment stored in the equipment storage unit is rental equipment available to the user who uses the space, and when the use reservation received by the reservation manager from the user input unit includes a rental request for the rental equipment, the management controller causes the storage to store rental information of the rental equipment in association with the reservation information.

According to such a configuration, with respect to the rental equipment available to the user, when the use reservation received by the reservation manager from the user input unit includes the rental request for the rental equipment, the management controller causes the storage to store the rental information of the rental equipment in association with the reservation information, so that the rental equipment can be reliably transported to the reserved space in accordance with the date and time of use reserved by the user.

In some implementations, the management device includes a space allocator that allocates at least a part of all available space according to the use reservation received from the user input unit and causes the storage to store allocation information in which the space is allocated, and the management controller generates the transportation command for transporting the equipment to the reserved space on the reservation date and time on the basis of the reservation information, the equipment information, and the allocation information.

According to such a configuration, the space allocator of the management device allocates the space according to the use reservation and causes the storage to store the allocation information, and the management controller generates the transportation command for transporting the equipment to the reserved space on the reservation date and time on the basis of the reservation information, the equipment information, and the allocation information, so that it is possible to allocate an appropriate space to the user according to the reservation and reliably transport the equipment to an allocated space

BRIEF DESCRIPTION OF THE DRAWINGS

For a better understanding of the various described implementations, reference should be made to the Detailed Description below, in conjunction with the following drawings in which like reference numerals refer to corresponding parts throughout the figures.

FIG. 3 is a flowchart illustrating an operation of the management device of the rental space in accordance with some implementations.

DETAILED DESCRIPTION

Hereinafter, implementations of the present disclosure will be described with reference to the drawings.

Figure 1:
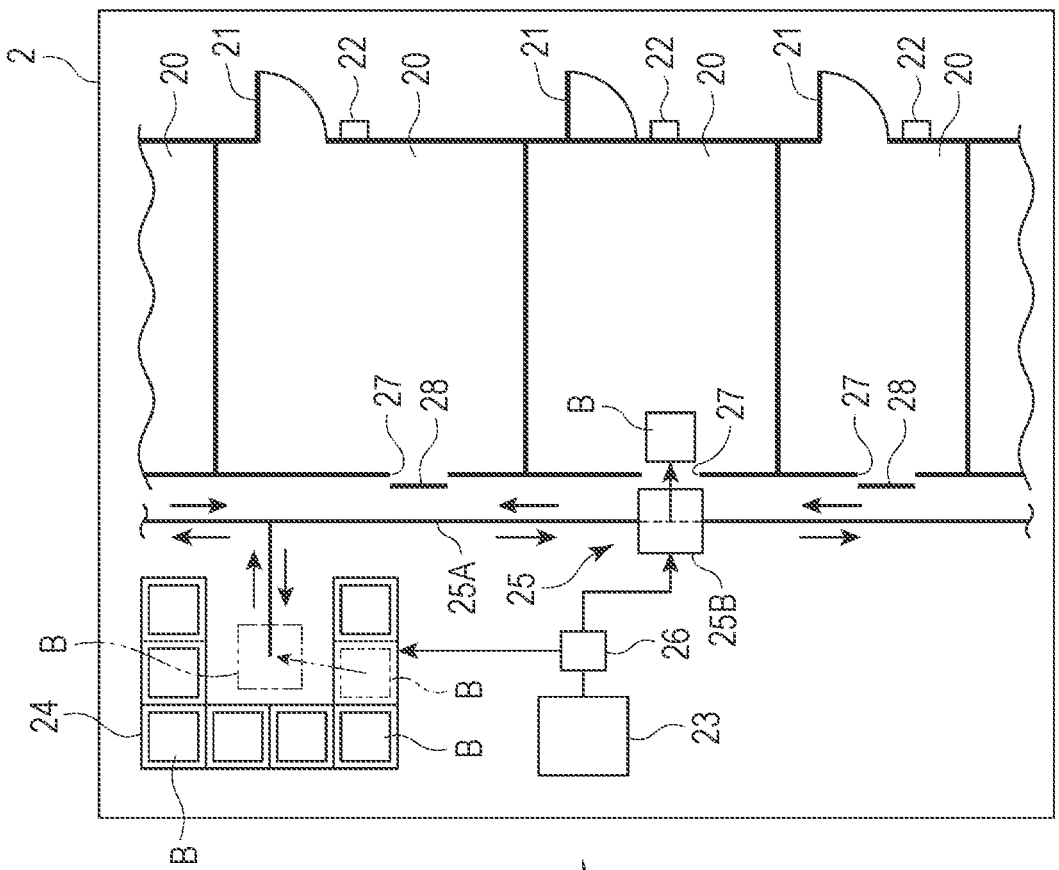
FIG. 1 is a schematic configuration diagram of a rental space in accordance with some implementations.
Figure 1:
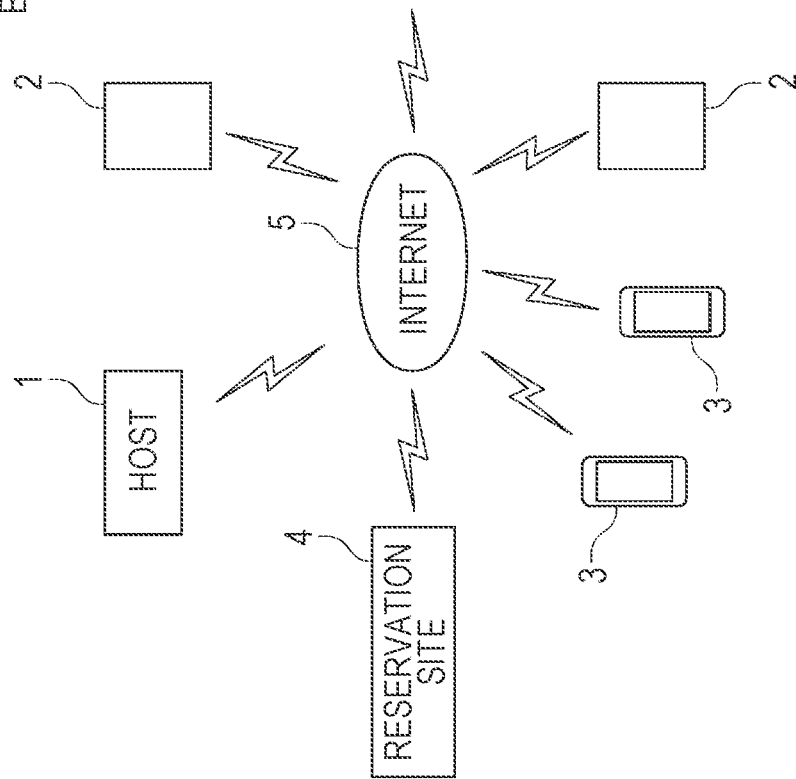

FIG. 1 is a schematic configuration diagram of a rental space (also referred to herein as a reservation system) in accordance with some implementations.

As illustrated in FIG. 1, the rental space includes a host 1 which is a management device for managing the rental space, and a plurality of rooms 20 which are spaces for renting to users, and there are a plurality of buildings 2 having the plurality of rooms 20. The host 1, the buildings 2, terminal devices 3 (e.g., mobile phones, smart phones, and/or personal computers) owned by the user, and a reservation site 4 for reserving a rental of the room 20 can be connected to each other via the Internet 5 which is a public network as a communication line. The user can access the reservation site 4 via the Internet 5 using the terminal device 3 as a user input unit, search for the room 20 according to a purpose, and specify a usage time and the number of users, to perform a reservation. When the reservation site 4 receives the reservation from the user, the reservation site 4 transmits reservation information including the room 20 for which the reservation has been confirmed and a reservation time to the host 1. The host 1 transmits information of the room 20 set on the basis of the reservation information to the terminal device 3.

The building 2 includes the rooms 20 (e.g., conference rooms and/or training rooms), and each room 20 is provided with a doorway 21 and a locking device 22 for locking and unlocking the doorway 21. The locking device 22 can be unlocked by an authentication key (e.g., a password or a barcode) issued from the reservation site 4 to the terminal device 3 of the user, and the authentication key is randomly changed each time it is used, so that only the user who made a reservation at that time can unlock the locking device 22 by using a unique authentication key. A communication terminal device 23 (e.g., a modem or a router) is connected to each room 20 via a local area network (LAN), and the communication terminal device 23 is connected to the host 1 via the Internet 5. Further, the building 2 is provided with a warehouse 24 as an equipment storage unit for storing equipment B that can be used in each room 20, a transportation unit 25 that moves between the warehouse 24 and the room 20 to transport the equipment B, and a transportation control unit 26 that is connected to the host 1 via the communication terminal device 23 and the Internet 5 and controls the transportation unit 25.

A plurality of racks are provided in the warehouse 24, and the equipment B stored in a container is stored in each rack. Each rack and the equipment B in the warehouse 24 are assigned identifiers (IDs) and are managed by the transportation control unit 26, and are also managed by an equipment manager 32 of the host 1 to be described below. The transportation unit 25 includes a rail 25A as a transportation route connecting the warehouse 24 and the room 20, and a self-propelled carriage 25B that can travel along the rail 25A. The self-propelled carriage 25B is travel-controlled by the transportation control unit 26 and is configured to be able to load and unload the container of the equipment B to and from each rack in the warehouse 24. Further, each room 20 is provided with a receiving port 27 that is opened facing the transportation unit 25, and a door 28 for opening and closing the receiving port 27. The door 28 is controlled to be opened and closed by the transportation control unit 26, the door 28 is opened when the self-propelled carriage 25B comes carrying the equipment B, and the equipment B is carried into the room 20 from the self-propelled carriage 25B, and then the door 28 is closed. On the other hand, when the equipment B is taken out, the self-propelled carriage 25B collects the equipment B after the door 28 is opened, the door 28 is closed and the self-propelled carriage 25B travels to the warehouse 24, and the equipment B is stored in a predetermined rack.

Figure 2:
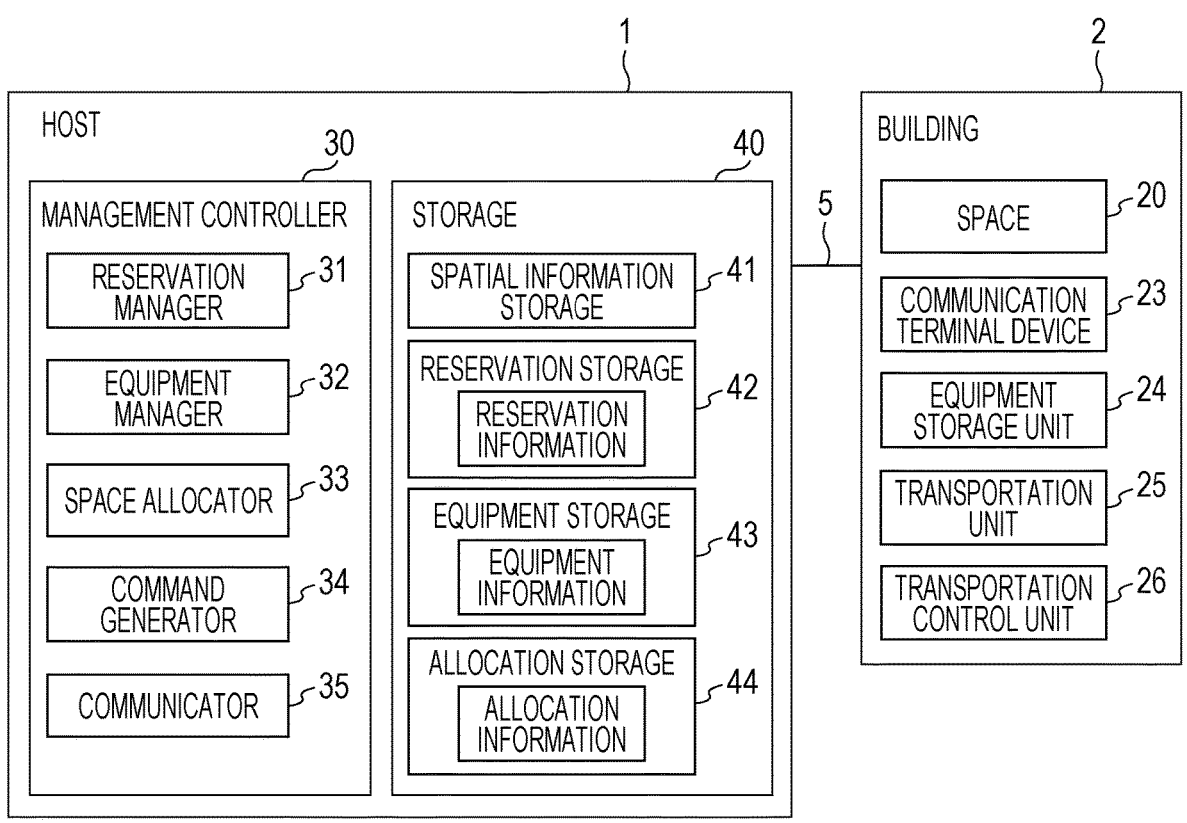
FIG. 2 is a block diagram illustrating a configuration of a management device of the rental space in accordance with some implementations.

FIG. 2 is a block diagram illustrating a configuration of the management device for the rental space in accordance with some implementations.

The host 1, which is the management device for the rental space, includes a server device, and as illustrated in FIG. 2, includes a management controller 30 including a central processing unit (CPU) or the like, and a storage 40 including a storage device (e.g., a hard disk drive (HDD)). The management controller 30 includes a reservation manager 31 that manages the reservation information reserved by the user via the reservation site 4, the equipment manager 32 that manages equipment information on the equipment B stored in the warehouse 24, a space allocator 33 that allocates the room 20 to be rented on the basis of the reservation information, a command generator 34 that generates a transportation command for transporting the equipment B on the basis of the reservation information and the equipment information, and a communicator 35 (sometimes referred to as a transceiver) that controls communication with the communication terminal device 23, the reservation site 4, and the terminal device 3 of the user.

The storage 40 includes a spatial information storage 41 that stores information of all the rooms 20 to be managed, a reservation storage 42 that stores the reservation information including reservation date and time and the number of users who use the room 20, an equipment storage 43 that stores the equipment information on the equipment B stored in the warehouse 24, and an allocation storage 44 that stores allocation information of the room 20. When the reservation manager 31 receives the reservation from the user, the management controller 30 causes the reservation storage 42 to store the reservation information on the basis of the reservation information and the information of all the rooms 20 stored in the spatial information storage 41. Further, when the reservation from the user includes a request for use of the equipment B, the management controller 30 reads the equipment information on the equipment B from the equipment storage 43, and causes the reservation storage 42 to store the equipment information in association with the reservation information. Furthermore, the management controller 30 causes the space allocator 33 to allocate the room 20 to be rented, and causes the allocation storage 44 to store the allocation information of the room 20. When date and time information, number of users information, the equipment information, and the allocation information are determined for the received reservation information, the management controller 30 transmits completion of the reservation to the terminal device 3 of the user by the communicator 35.

The reservation manager 31, the equipment manager 32, the space allocator 33, the command generator 34, and the communicator 35 may be executed as a program by the CPU of the server device, may be configured by independent devices, or may be configured using cloud computing. Further, the storage 40 may be configured by the storage device (e.g., the HDD), or may use a storage unit of a cloud service. Further, the terminal device 3 that functions as the user input unit may be a device (e.g., a smartphone) including an input unit that receives input from the user, a display for notifying the user of information, a communicator (sometimes referred to as a transceiver) for transmitting and receiving information to and from the host 1, and a controller that controls the input unit, the display, the communicator, and the like, or may be a device in which the input unit, the display, the communicator, and the controller are configured by independent devices.

FIG. 3 is a flowchart illustrating an operation of the management device for the rental space in accordance with some implementations.

The flowchart of FIG. 3 illustrates an operation procedure of the host 1 after receiving a new reservation by the user. When the reservation manager 31 receives the reservation from the reservation site 4, the management controller 30 of the host 1 causes the reservation storage 42 to store the reservation information on the basis of a content of the reservation (Step ST1). Subsequently, when the reservation from the user includes the request for use of the equipment B, the management controller 30 reads the equipment information on the equipment B from the equipment storage 43 and causes the storage 42 to store the equipment information in association with the reservation information (Step ST2).

Here, the equipment B used by the user is user equipment that the user deposited in advance and stored in the warehouse 24, and an ID that associates the user who has deposited the equipment B with the equipment B is assigned by the equipment manager 32 and is stored in the equipment storage 43, and is managed by the transportation control unit 26 based on the ID. When the user who made the reservation is associated with the user equipment, the reservation manager 31 causes the reservation storage 42 to store the use information of the user equipment in association with the reservation information. Further, the equipment B may be the rental equipment that can be rented to the user, and the equipment information including an ID as the rental equipment is stored in the equipment storage 43, and is managed by the transportation control unit 26 based on the ID. When the use reservation from the user includes the rental request for the rental equipment, the reservation manager 31 causes the reservation storage 42 to store the rental information of the rental equipment in association with the reservation information.

Subsequently, the management controller 30 causes the space allocator 33 to set the allocation information of the room 20 to be rented and causes the allocation storage 44 to storage the allocation information, on the basis of the reservation information, the equipment information, and the information of all the rooms 20 stored in the spatial information storage 41 (allocation information setting step: Step ST3). Specifically, the space allocator 33 extracts a room 20 that is vacant on the reservation date and time and has a size suitable for the number of users reserved, from all the rooms 20 stored in the spatial information storage 41, and sets the allocation information to allocate the extracted room 20. Note that if there is no room 20 that matches the reservation information, the management controller 30 causes the command generator 34 to generate a nonconformity command, and causes the communicator 35 to transmit the nonconformity command to the terminal device 3 of the user (reservation confirmation notification step: Step ST4).

When the reservation for the room 20 is confirmed as described above, the management controller 30 is in a standby state waiting for reservation change reception, and checks whether the reservation has been changed (Step ST5). In Step ST5, the reservation manager 31 of the management controller 30 checks whether there is an input for reservation change from the reservation site 4 at predetermined time intervals. The management controller 30 checks whether the reservation manager 31 has received the reservation change from the reservation site 4, and if the reservation change is received (YES in Step ST5), the management controller 30 performs the above-mentioned Steps ST1 to ST4, updates the equipment information and the allocation information on the basis of the reserved information changed, and the user is notified. On the other hand, if the reservation change is not received (NO in Step ST5), Step ST5 is repeated to wait for the reservation change reception until a predetermined time before the reservation time (NO in Step ST6). When the predetermined time before the reservation time (for example, 30 minutes before) comes (YES in Step ST6), the reservation change reception is terminated.

When the predetermined time before the reservation time comes (YES in Step ST6), the management controller 30 causes the command generator 34 to generate the transportation command to transport the equipment B to the reserved room 20 on the basis of the reservation information and the equipment information, and causes the communicator 35 to transmit the transportation command to the communication terminal device 23 and the transportation control unit 26 (transportation command generation step: Step ST7). Upon receiving the transportation command, the transportation control unit 26 transports the equipment B from the warehouse 24 to the room 20 based on the transportation command (transportation execution step: Step ST8). Further, when it is confirmed that the user of the room 20 has left after the usage time based on the reservation information has elapsed, the transportation control unit 26 takes out the equipment 20 from the room 20 and stores the equipment 20 in the predetermined rack of the warehouse 24. This completes use of the rental space.

In accordance with some implementations, the following operations and effects can be obtained.

(1) The management controller 30 of the host 1 causes the command generator 34 to generate the transportation command for transporting the equipment B to the room 20 reserved according to the reservation date and time, on the basis of the reservation information stored in the reservation storage 42 and the equipment information stored in the equipment storage 43, and transmits the transportation command to the transportation control unit 26 of the building 2. The transportation control unit 26 receives the transportation command from the management controller 30 via the Internet 5, and drives and controls the transportation unit 25 based on the transportation command, to transport the equipment B from the warehouse 24 to the reserved room 20 by the reservation date and time. Therefore, the equipment B can be transported to the reserved room 20 according to the reservation of the user, and the user can reduce the time required for preparation on the day of the reservation, so that convenience of the user can be improved.

(2) With respect to the user equipment deposited in advance by the user as the equipment B, the equipment manager 32 causes the equipment storage 43 to store the equipment information in which the user equipment is associated with the user who has deposited the user equipment, and the reservation manager 31 causes the reservation storage 42 to store the use information of the user equipment in association with the reservation information, so that the user equipment can be reliably transported to the reserved room 20 in accordance with the date and time of use reserved by the user. On the other hand, with respect to the rental equipment that can be rented to the user as equipment B, when the use reservation received includes the rental request for the rental equipment, the reservation manager 31 causes the reservation storage 42 to store the rental information of the rental equipment in association with the reservation information, so that the rental equipment can be reliably transported to the reserved room 20 in accordance with the date and time of use reserved by the user.

(3) The space allocator 33 of the management controller 30 allocates the room 20 according to the use reservation and causes the allocation storage 44 to store the allocation information, and the command generator 34 generates the transportation command for transporting the equipment B to the reserved room 20 on the reservation date and time on the basis of the reservation information, the equipment information, and the allocation information, so that an appropriate room 20 can be allocated to the user according to the reservation, and the equipment B can be reliably transported to the allocated room 20. By automatically allocating the appropriate room 20 from all the available rooms 20 in this way, labor costs can be reduced compared to a case where the room 20 is manually allocated, and when the reservation is received or the reservation is changed, the allocation information can be updated immediately.

Additional Implementations

The present disclosure is not limited to the above implementations, and modifications, improvements, and the like within the range in which the object of the present disclosure can be achieved are included in the present disclosure.

For example, in the above implementations, a case in which the room 20 of building 2 is rented as the rental space is exemplified, but the rental space is not limited to a conference room, a training room, and the like, and may be a tennis court, a baseball field, a stadium, a parking lot, or the like, which are outdoor spaces, or a karaoke room, a rental office, a reading space, or the like.

In the above implementations, a case where the host 1 as a management device includes the server device connected to the terminal device 3 and to the communication terminal device 23 via the Internet 5 which is the communication line is exemplified, but the management device is not limited to that including such a centralized management type server device. That is, the management device may be a distributed management type device, for example, a device using a distributed transaction ledger typified by blockchain can be used, and any device that can manage the reservation information, and send and receive various commands to and from the communication terminal device 23 can be used. Further, in the above implementations, the host 1 as the management device and the reservation site 4 are separately provided and connected to each other via the Internet 5, but the present disclosure is not limited to this, and the host 1 and the reservation site 4 may be provided in a single site, or the function of the management device and the function of the reservation site may be implemented by a plurality of devices distributed on the Internet.

In the above implementations, the management controller 30 includes the space allocator 33, and the space allocator 33 automatically updates the allocation information, but the space allocator 33 may not automatically update the allocation information, and the allocation information may be manually updated by an administrator or the like. Further, the management controller 30 may include a fee calculator for calculating a rental fee of the room 20 to be rented, and the fee calculator may calculate the fee according to whether or not the equipment B is used, in addition to calculating the rental fee according to the usage time and the number of users of the room 20. Furthermore, when the equipment B is the user equipment, a storage fee may be added to the rental fee, and when the equipment B is the rental equipment, a rental fee of the equipment may be added to the rental fee of the room.

In the above implementations, an example in which the warehouse 24 as the equipment storage unit is provided inside the building 2 as the rental space is shown, but the equipment storage unit is not limited to the warehouse 24 inside the building or facility, but may be a warehouse or the like outside the building. Further, the equipment storage unit is not limited to one that centrally stores the equipment B like the warehouse 24 of the above implementations, but may be one that is distributedly provided in various parts of the building or each room 20. Further, in the above implementations, the transportation unit 25 including the rail 25A and the self-propelled carriage 25B is exemplified as the transportation unit, but the transportation unit is not limited to this, and may be, for example, an autonomous traveling unit capable of traveling on a passage without a rail, or a traveling crane capable of traveling by being suspended from a rail provided on a ceiling or a wall. Furthermore, the transportation control unit is not limited to the transportation control unit 26 provided in the building 2 and connected to the communication terminal device 23, and may be mounted on the self-propelled carriage 25B or provided on the host 1.

The foregoing description has been described with reference to specific implementations. However, the illustrative discussions above are not intended to be exhaustive or to limit the claims to the precise forms disclosed. Many variations are possible in view of the above teachings. The implementations were chosen and described to best explain principles of operation and practical applications, to thereby enable others skilled in the art.

The various drawings illustrate a number of elements in a particular order. However, elements that are not order dependent may be reordered and other elements may be combined or separated. While some reordering or other groupings are specifically mentioned, others will be obvious to those of ordinary skill in the art, so the ordering and groupings presented herein are not an exhaustive list of alternatives.

As used herein: the singular forms "a", "an," and "the" include the plural forms as well, unless the context clearly indicates otherwise; the term "and/or" encompasses all possible combinations of one or more of the associated listed items; the terms "first," "second," etc. are only used to distinguish one element from another and do not limit the elements themselves; the term "if" may be construed to mean "when," "upon," "in response to," or "in accordance with," depending on the context; and the terms "include," "including," "comprise," and "comprising" specify particular features or operations but do not preclude additional features or operations.

What is claimed is:

1. A reservation and equipment management system, comprising:
    a management device that is connected to a communication line to manage information;
    a user input means that is connected to the management device via the communication line and receives information input from a user for transmission to the management device;
    an equipment storage means configured to store equipment available for use in a plurality of rental spaces;
    a transportation means configured to transport the equipment between the equipment storage means and the plurality of rental spaces; and
    a transportation control means that is connected to the management device via the communication line and configured to control the transportation means;
    wherein the management device is configured to:
        prior to allocating any of the plurality of rental spaces to the user, obtain, from the user input means, (i) reservation information including a request to rent a space to the user at a specified date and time, and (ii) equipment information including a request for equipment;
        obtain spatial information corresponding to each of the plurality of rental spaces;
        allocate a reserved space of the plurality of rental spaces based on the reservation information and the spatial information;
        associate (i) the equipment information corresponding to the request for equipment with (ii) the reservation information obtained prior to the allocating; and
        generate a transportation command for transporting equipment corresponding to the equipment information to the reserved space by a reservation date and time based on the reservation information; and
    wherein the transportation control means is configured to:
        receive the transportation command from the management device via the communication line; and
        cause the transportation means to transport the equipment corresponding to the equipment information to the reserved space by the reservation date and time in accordance with the transportation command;
    wherein:
        the equipment is user equipment and the management device is configured to (i) assign an identifier to the user equipment associating the user equipment with the user and (ii) associate the equipment information corresponding to the user with the reservation information in accordance with the identifier; or
        the equipment is rental equipment and the management device is configured to (i) obtain a rental request for the rental equipment included in the reservation information and (ii) associate the equipment information corresponding to the user with the reservation information in accordance with the rental request.

2. The reservation and equipment management system of claim 1, wherein the management device is configured to:
    allocate the reserved space of the plurality of rental spaces in accordance with the reservation information and use information of the plurality of rental spaces;
    store allocation information associated with the allocating of the reserved space; and
    generate the transportation command for transporting the equipment corresponding to the equipment information to the reserved space in accordance with the reservation information, the equipment information, and the allocation information.

3. The reservation and equipment management system of claim 1, wherein the transportation control means is configured to:
    confirm, based on the reservation information, that a usage time of the reserved space elapsed; and
    cause the transportation means to transport the equipment corresponding to the equipment information from the reserved space back to the equipment storage in accordance with the confirming that the usage time elapsed.

4. The reservation and equipment management system of claim 1, wherein the equipment storage means centrally stores the equipment available for use in the plurality of rental spaces.

5. The reservation and equipment management system of claim 1, wherein the equipment storage means is distributed among a plurality of parts of a building comprising the plurality of rental spaces.

6. The reservation and equipment management system of claim 1, wherein the transportation means include (i) a rail or passage, and (ii) a self-propelled carriage, an autonomous traveling unit, or a traveling crane.

* * * * *